United States Patent [19]

Harned

[11] 3,982,435

[45] Sept. 28, 1976

[54] AIR MASS FLOW MEASURING APPARATUS

[75] Inventor: John L. Harned, Grosse Pointe Woods, Mich.

[73] Assignee: General Motors Corporation, Detroit, Mich.

[22] Filed: Dec. 18, 1975

[21] Appl. No.: 642,006

[52] U.S. Cl. ............................ 73/194 M; 73/194 A
[51] Int. Cl.² ....................... G01F 1/86; G01F 1/66
[58] Field of Search ................... 73/194 A, 194 M

[56] References Cited
UNITED STATES PATENTS

| | | |
|---|---|---|
| 2,911,825 | 11/1959 | Kritz .................................. 73/194 M |
| 2,991,650 | 7/1961 | Katzenstein et al. ............. 73/194 M |
| 3,496,771 | 2/1970 | Moffatt ............................. 73/194 M |
| 3,731,532 | 5/1973 | Courty ............................... 73/194 A |

Primary Examiner—Charles A. Ruehl
Attorney, Agent, or Firm—Warren D. Hill

[57] ABSTRACT

A pair of spaced sound pulse transducers in a passage carrying an air flow are used with a driving and time measuring circuit for measuring the upstream and downstream sound pulse propagation times. One of the transducers is mounted on density responsive bellows for movement therewith so that the transducer spacing depends on the air density. A temperature transducer senses the air temperature. Air mass flow is electrically calculated from the temperature and the upstream and downstream pulse propagation times.

3 Claims, 3 Drawing Figures

AIR MASS FLOW MEASURING APPARATUS

This invention relates to apparatus for measuring air mass flow.

It is often desirable to determine the air mass flow through a passage and to accomplish the measurement with a minimum of expense. It is especially desirable to minimize the expense of the transducers measuring the necessary air parameters. For example, in motor vehicles having advanced engine controls, it is desirable to determine the air mass flow to control air fuel ratio supplied to an engine. The electrical controls and calculations of the air mass flow measurements are readily carried out in a digital computing apparatus available on the vehicle for this and other functions. Thus the transducers required to sense air mass flow may make up the major expense of the system.

It is therefore an object of the invention to measure air mass flow through a passage with transducer apparatus of minimum expense.

The invention is carried out by providing in an air flow passage a pair of sound pulse transducers, one of which is mounted for movement by an air density responsive transducer, a temperature transducer in the passage, a circuit for driving the sound pulse transducers and determining the pulse propagation times and for calculating the air mass flow.

The above and other advantages will be made more apparent from the following specification taken in conjunction with the accompanying drawings wherein like reference numerals refer to like parts and wherein.

Figure 1:
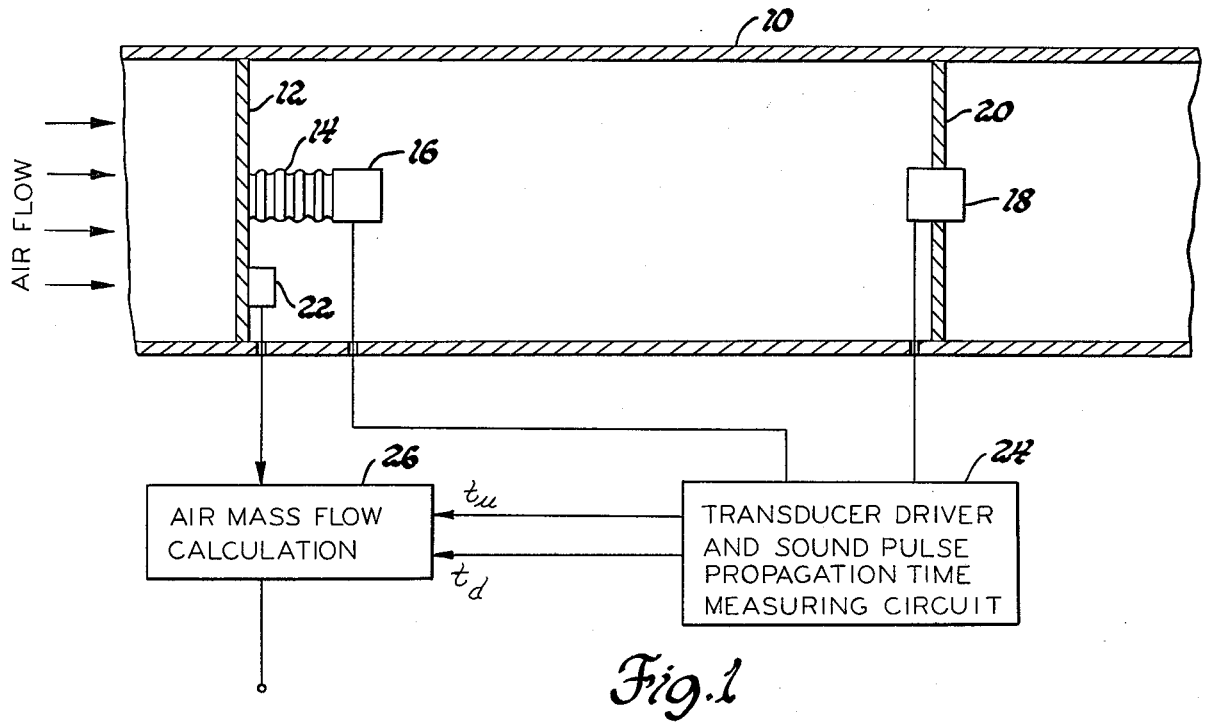
FIG. 1 is a diagramatic cross-sectional view of an air flow passage containing air mass flow measuring transducers and associated control and calculation circuits; according to the invention.

As shown in FIG. 1, an air passage or duct 10 carries an air flow which is to be measured. A support member 12 within the passage 10 comprising a thin spider element designed to minimize air flow disturbances supports one end of a density responsive bellows 14. The other end of the bellows which is movable according to changes of air density carries a transducer 16. Another transducer 18 downstream of the first is carried by another spider element 20 such that the transducers are axially spaced along the passage. Each of the transducers is a piezoelectric element for transmitting and receiving sound pulses. Although the transducers are shown as being axially mounted in the passage 10 they may, as is well known in the art, be located at the side walls of the passage and spaced diagonally of the passage 2. The density responsive bellows 14 is a sealed bellows containing an inert gas which is precharged at a predetermined density and temperature. In use the bellows interior assumes the same temperature as that of the air flow around it so that the only variable effecting the length of the bellows is the density of the air. A specific bellows suitable for this purpose has an O.D. of 1⅛ inch, and I.D. of ⅝ inch, has eight convolutions, a free length of 0.824 inch, an area of 0.62 in$^2$, a stiffness of 18.75 lb/in and a maximum travel of ± .4 inch. A temperature transducer 22 secured to the spider element 12 provides an electrical signal corresponding to the air temperature T.

A transducer driver and sound pulse propagation time measuring circuit 24 alternatively pulses transducers 16 and 18 and measures the sound propagation time $t_u$ and $t_d$ for upstream and downstream pulses respectively. An air mass flow calculation circuit 26 has inputs corresponding to T, $t_u$ and $t_d$ and calculates the air mass flow. The circuits 24 and 26 may be in the form of specific control and computation circuitry but preferably are in the form of preprogrammed digital data processing equipment such as a microprocessor. The spacing of the transducers 16 and 18 depends on the air density and the upstream and downstream pulse propagation times depends on the transducer spacing and the air velocity. Thus the propagation times $t_u$ and $t_d$ inherently contain the information of air velocity and density so that along with the air temperature information T, the air mass flow can be calculated.

Figure 2:
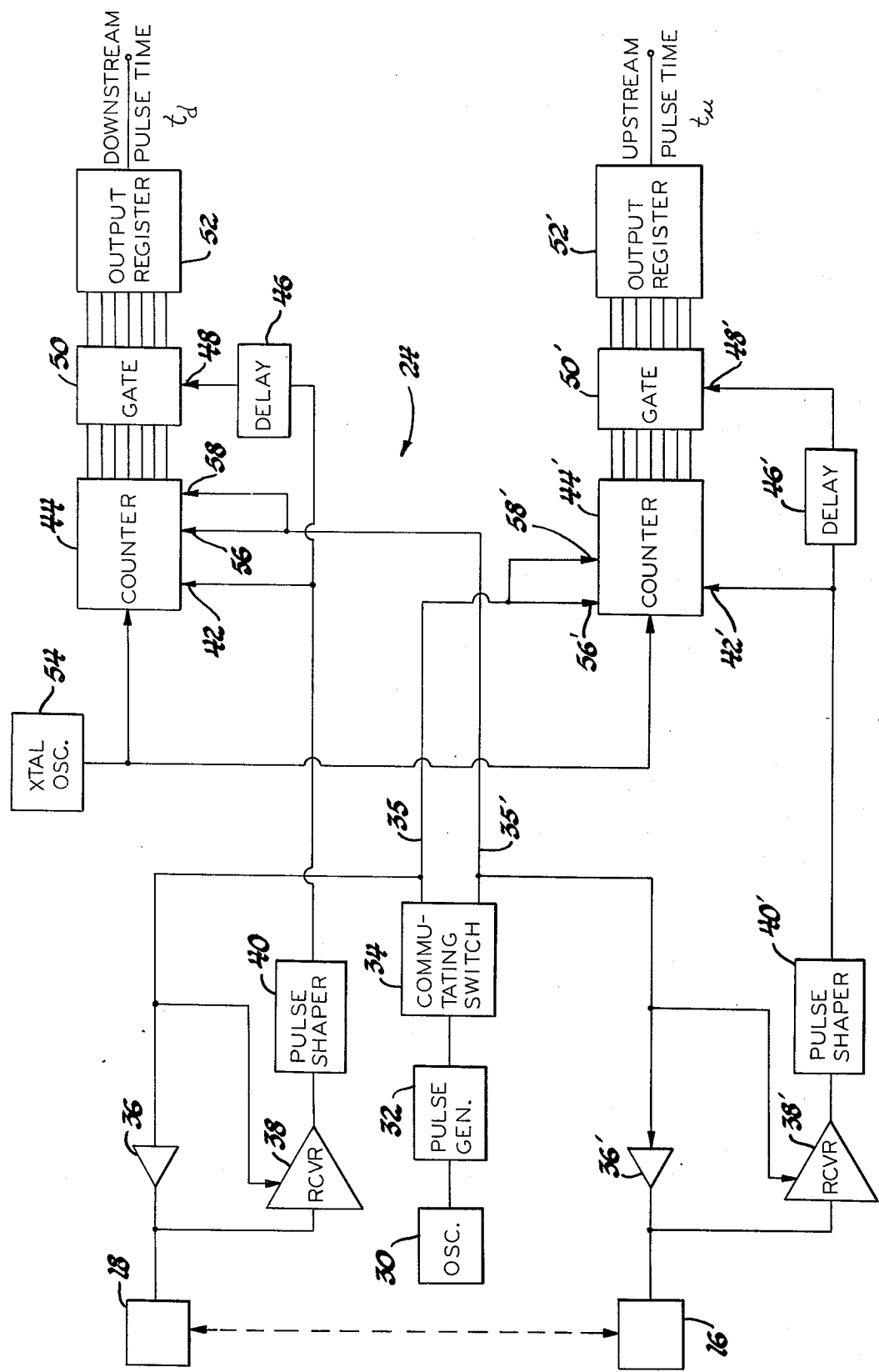
FIG. 2 is a block diagram of the transducer driver and sound pulse propagation time measuring circuit of FIG. 1.

FIG. 2 illustrates the transducer and sound pulse propagation measuring circuit 24. An oscillator 30 controls a pulse generator 32 which in turn controls an electronic commutating switch 34. Two outputs of the commutating switch are alternately energized. One output 35 leads to a driver amplifier 36 which drives the downstream piezoelectric transducer 18 causing it to emit a sound pulse. A receiver amplifier 38 connected to the transducer 18 to detect the receipt of sound pulses at the transducer 18 produces an output which is fed to a pulse shaper 40. The line 35 is connected to the amplifier 38 to disable the amplifier when line 35 is energized. The pulse shaper 40 provides an output to the disable terminal 42 of a counter 44 and also through a delay circuit 46 to read pulse input 48 of a gate 50. An output register 52 registers the count present at the counter 44 when the gate 50 is enabled. The other commutating switch output 35' is connected to enable and reset terminals 56 and 58 respectively of the counter 44. The line 35' is also connected to a driver amplifier 36' which energizes the upstream piezoelectric transducer 16. Other control circuitry associated with the upstream transducer 16 includes the elements 38' through 58' which are identical to the elements 32 through 58 described above. Crystal oscillator 54 simultaneously feeds a clock signal to both counters 44 and 44'.

In operation when the line 35' is energized, the driver 36' is triggered to drive the upstream transducer 16 which emits a sound pulse toward the transducer 16. At the same time, the receiver 38' is disabled and the counter 44 is reset and enabled by the signal on line 35'. The counter 44 thereafter counts the pulses from the crystal oscillator 54 until the sound pulse is received by the transducer 18 and detected by the receiver 38 which then disables the counter 44 and after a short delay enables the gate 50 to transfer the counter value to the output register 52. Thus the number of counts registered corresponds to the downstream pulse propagation time $t_d$. In the same manner, the upstream pulse propagation time $t_u$ is registered at the upstream output register 52' whenever the commutating switch 34 energizes the output line 35.

By way of example, the commutating switch 34 has a frequency of 20 Hz so that both output registers are updated every 50 milliseconds to maintain a current measure of propagation times. The crystal oscillator 54 having a frequency of 10.56 Mega Hertz provides a suitable time resolution for a nominal transducer spacing of 6 inches.

Figure 3:
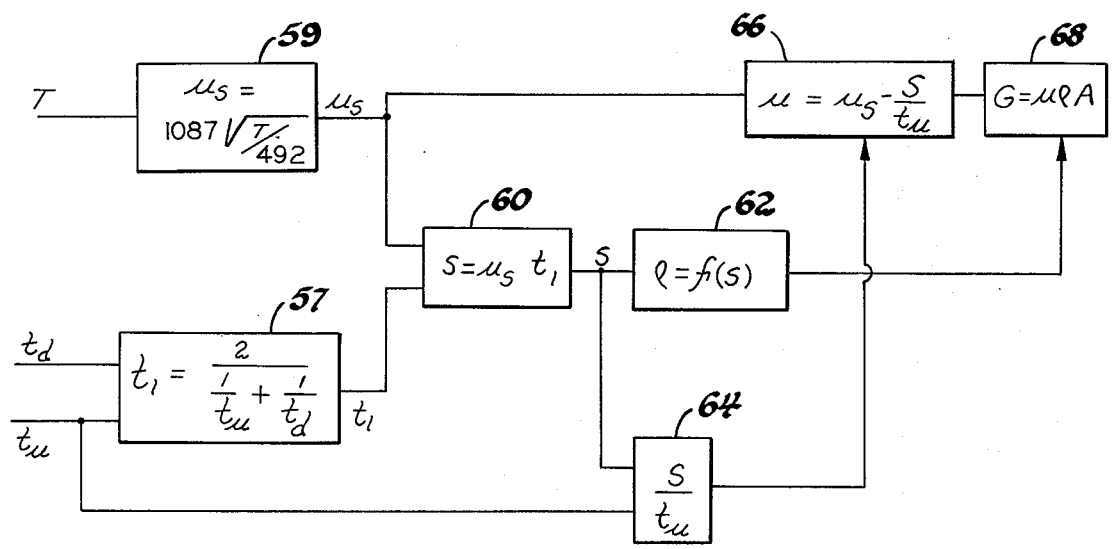
FIG. 3 is a block diagram of the air mass flow calculation circuit of FIG. 1.

Referring to FIG. 3, the calculation circuit using the time measurements derived in FIG. 2 and the temperature T computes the air mass flow G. As shown in the block 57, the time $t_1$ is computed from the relationship $$\frac{2}{1/t_u + 1/t_d}$$

where time $t_1$ is the sound pulse propagation time corrected to zero air flow. The velocity of sound in air $u_s$ is a function only of air temperature and is calculated from the temperature input T in the block 59 by the relationship $$u_s = 1087 \left(\frac{T}{492}\right)^{0.5}.$$

The values $u_s$ and $t_1$ are multiplied in block 60 to obtain S, the spacing between the two transducers 16 and 18. Air density is computed in block 62 as a function of the spacing S. Air density $\rho$ is calculated from a bellows calibration using a third order polynominal of the form $\rho = a + bL + cL^2 + dL^3$, where L is the bellows length calculated by the relationship $L = L_o + S_o - S$ where $L_o$ is the bellows length and $S_o$ is the transducer spacing each at a reference density $\rho_o$. Thus $\rho$ is a function of S and depends upon the characteristic of the specific bellows used. In block 64, S is divided by $t_u$ and in block 66 the air velocity u is calculated by the relationship $$u = u_s - \frac{S}{t_u}.$$

Finally in the multiplier of block 68, the air mass flow G is calculated by the relationship $G = u\rho A$ where the constant A is the cross-sectional area of the air passage.

It is apparent that many types of calculation circuits may be used to calculate the mass air flow, although it is particularly convenient to use a digital technique particularly since the propagation times $t_u$ and $t_d$ are in digital form. the circuits of FIGS. 2 and 3 may be combined in a suitably programmed microprocessor to expeditiously control the pulsing of the sound pulse transducers and to make the resulting time measurements and calculations.

It should be noted that the apparatus according to this invention eliminates the need for an absolute pressure sensor to measure atmospheric pressure. On the other hand, the atmospheric pressure P, if desired, can be directly calculated from the signals derived in FIG. 3 according to the relationship $P = \rho RT/M$ where R and M are the universal gas constant and the molecular weight of air respectively.

It will thus be seen that the air mass flow sensor according to this invention requires only sound transducers, a density transducer, a temperature transducer and associated circuitry to provide an accurate relatively inexpensive apparatus.

The embodiments of the invention in which an exclusive property or privilege is claimed are defined as follows:

1. An apparatus for meaasuring the air mass flow through a passage comprising
   a pair of sound pulse transducers disposed at upstream and downstream locations of the passage respectively,
   means for varying the spacing between the sound pulse transducers as a function of air density,
   a circuit coupled to the sound transducers for measuring upstream and downstream sound propagation times,
   a temperature transducer mounted in the passage for measuring the air temperature,
   and electrical means responsive to the upstream and downstream sound propagation time measurements and the temperature measurement for determining the air mass flow through the passage.

2. An apparatus for measuring the air mass flow through a passage comprising
   a pair of sound pulse transducers disposed at upstream and downstream locations of the passage respectively,
   a bellows exposed to the air flow and having a portion movable in response to air density, one of the sound pulse transducers being mounted for movement with the movable portion of the bellows whereby the transducer spacing depends on the air density,
   a circuit coupled to the sound transducers for measuring upstream and downstream sound propagation times,
   a temperature transducer mounted in the passage for measuring the air temperature,
   and electrical means responsive to the upstream and downstream sound propagation time measurements and the temperature measurement for determining the air mass flow through the passage.

3. An apparatus for measuring the air mass flow through a passage comprising
   a pair of spaced sound pulse transducers disposed in the passage at upstream and downstream locations respectively,
   a density transducer which causes a displacement as a function of air density, one of the sound pulse transducers being mounted on the density transducer to vary the spacing between the sound pulse transducers as the air density varies,
   a circuit for alternately pulsing each of the sound transducers to emit sound pulses, and sensing the receipt of each sound pulse at the other sound transducer for measuring the upstream and downstream sound pulse propagation times, and producing electrical signals proportional to the propagation times,
   a temperature transducer mounted in the passage for producing an electrical signal proportional to the air temperature,
   and electrical means responsive to the upstream and downstream sound propagation time signals and the temperature signal for determining the air mass flow through the passage.

* * * * *